UNITED STATES PATENT OFFICE.

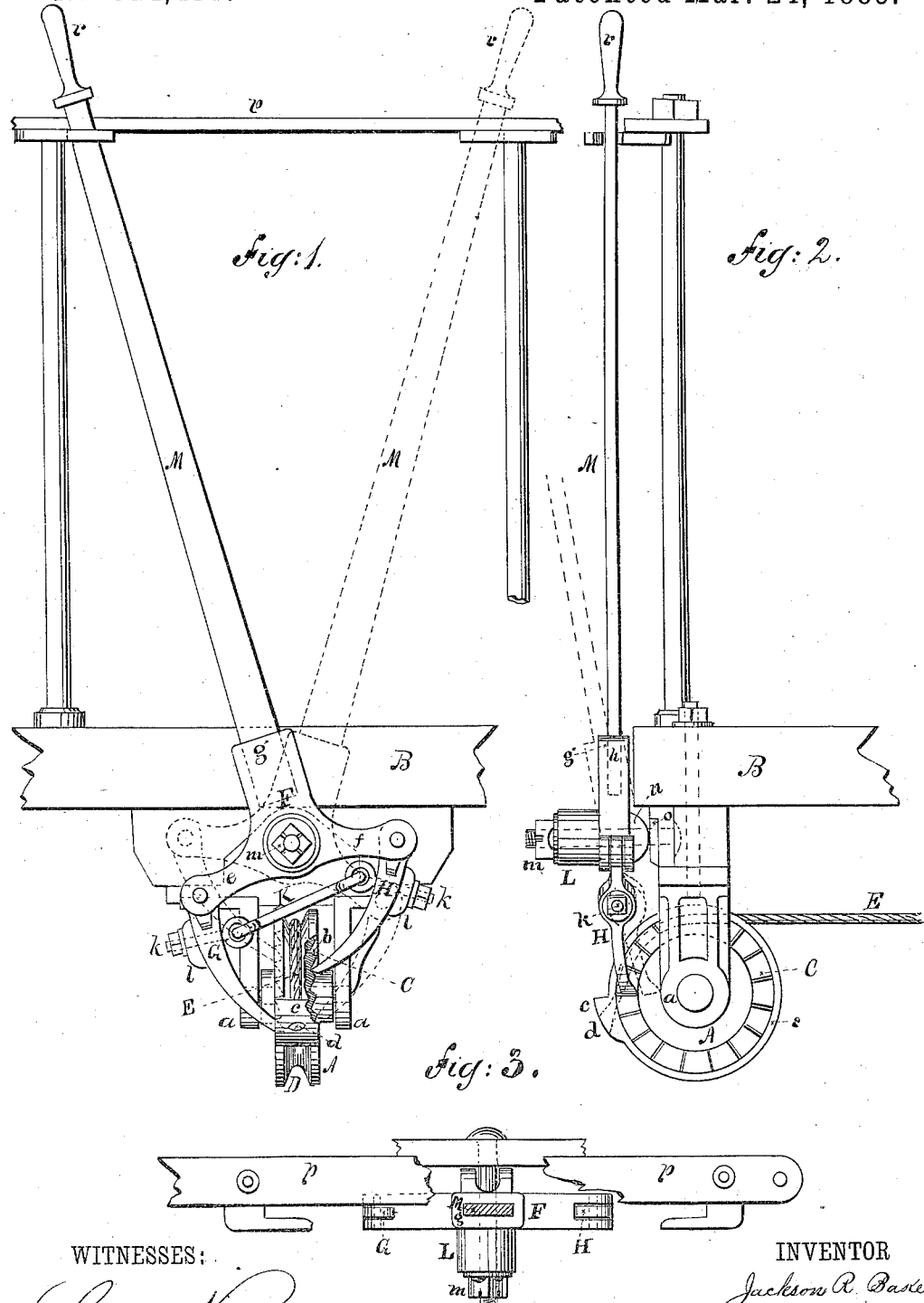

JACKSON R. BAKER, OF JERSEY CITY, NEW JERSEY.

CAR-BRAKE.

SPECIFICATION forming part of Letters Patent No. 314,417, dated March 24, 1885.

Application filed July 1, 1884. (No model.)

*To all whom it may concern:*

Be it known that I, JACKSON R. BAKER, of Jersey City, county of Hudson, State of New Jersey, have invented a new and useful Improvement in Car-Brakes; and I declare the following to be a full, clear, and exact description of the same, reference being had to the accompanying sheet of drawings, forming part of this specification.

This invention relates to an improvement in brakes for the wheels of cars, &c.; and the invention consists in a car-brake constructed and combined in the manner hereinafter shown, described, and claimed.

In the accompanying sheet of drawings, Figure 1 is a side elevation of the brake, partly in section; Fig. 2, an end view of same; Fig. 3, a plan or top view.

Similar letters of reference indicate like parts in the several figures.

The purpose of this invention is to provide a hand-brake for railway-cars and other vehicles that will not only enable the brakeman to employ greater force in putting on his brakes than is now possible with the ordinary hand-brake, but it will also enable him to apply the brake with greater celerity, and also to release the brakes instantaneously.

Cars provided with the ordinary hand-brake require the brakes to be applied at each end of the car when it is desired to check the motion of all the wheels of the car—that is to say, this is a common requirement in some classes of cars, whereas by my invention, as will be seen, a single brake may be fixed to but one end of a car, when its increased power will enable a single brakeman to effectively apply the brakes to all the wheels at once.

In the construction of my improved brake, a wheel, A, is supported in suitable bearings, *a*, beneath the platform B, to which the bearings are securely bolted. The wheel A is journaled and supported in the bearings *a* in a position that will enable it to turn in a direction parallel to the length of the car; or, in other words, this wheel A is journaled in a position at right angles to the sides of the car to which it is attached.

On each side of the wheel A, and near the outer edge of the same, and following the circular direction of the periphery of the wheel, are cast or otherwise secured a series of ratchets, C, the engaging-face *b* of each ratchet being nearly at right angles to the sides of the wheel A. Formed in the periphery of this wheel is a groove, D. This groove extends nearly around the periphery of the wheel, its continuity being interrupted, however, by a boss, *c*, through which is formed an opening, *d*. Into this opening *d* is fixed one end of a rope or chain, E.

To the platform B is pivoted or journaled a cross head, F. To each arm *e* and *f* of this cross-head are pivoted pawls G and H, and into the projection *g* of the cross-head is formed a socket, *h*. The pawls G and H are somewhat curved and their lower ends rest against the sides of the wheel A and engage into the ratchets C. To insure the engagement of these pawls with the ratchets, the two pawls are linked together by a link-bar, K. The eyebolts *k*, to which this link-bar is directly secured, pass through the pawls, to which they are confined by nuts of ordinary construction, rubber washers *l*, however, being interposed between these nuts and the sides of the pawls. The pivot or journal which secures the cross-head F to the platform of the car, and before mentioned, has fitted to it, or to that portion of it which projects beyond the outer face of the cross-head F, a rubber cushion or washer, L. This cushion at one end is received into a cavity formed in the face of the cross-head, and its other end receives the confining-nut *m*, which is screwed onto the projecting end of the pivot or journal of the cross-head F, a washer of metal being interposed between the nut and the rubber cushion. The rear face of the cross-head F has cast or otherwise formed on it a curved projection, *n*, which bears against a metal plate, *o*, fixed to the platform or frame-work of the platform immediately behind the cross-head F and projection *n*. Into the socket *h* of the cross-head is fitted one end of a lever, M. This lever projects upward and rests against the guard-rail *p* of the platform, and it terminates in a handle, *r*.

Now, when my brake is constructed substantially as is hereinbefore described, its operation is as follows:

To apply the brakes, one end of the rope or chain E having been previously connected with the system of ordinary brake bars, shoes and springs, and levers, the lever M is simply moved to the right or left once or twice, which operation causes the cross-head F to oscillate on its bearing or pivot, causing thereby the pawls G and H to alternately engage with the ratchets C on each side of the wheel A, forcing that wheel to revolve to a greater or less extent on its journal, and in its revolution to draw within the groove D in its periphery the rope or chain E, which in turn, by reason of its connection with the brake-bars, &c., before mentioned, forces the brake-shoes in contact with the peripheries of the car-wheels, and there holds them in a positive and unyielding manner. The brakes being applied in this way, nothing will disturb them until it is desired to "let them off," and this letting off is instantly accomplished by simply pressing outward the lever M. This outward pushing is facilitated by the elasticity of the rubber cushion L and by the curved projection n, which acts as a fulcrum bearing against the metal plate o. When the lever is pushed outward, as stated, the lower or engaging ends of the pawls G and H are forced inward on the sides of the wheel A, and clear from engagement with the ratchets C, when the ordinary springs on the brake-bars will instantly cause the wheel A to revolve in a reverse direction and release the brakes.

From the foregoing description of the construction and operation of my brake it will be seen that but very little effort is required on the part of the brakeman to enable him to apply the brakes with effective force, or to let the brakes off. When the brakes are on, the gravity of the lever M, when inclined at one side or the other, is enough to keep the brakes in position without any additional catch or fastening. That the operation of the link-bar K may not be too rigid, the rubber washers l are fixed, in the manner before stated, to lend their elasticity to the pawls and link-bar connection.

In the construction of this brake the diameter of the wheel A is an important consideration, for this diameter may be such as will enable the usual slack allowed for a brake-chain to be taken up on the periphery of the wheel by a comparatively small part of its revolution; besides, as is obvious, the greater the diameter of the wheel the more leverage is afforded to cause its turning.

To prevent the accidental sliding of the pawls G and H from the outer edge of the periphery of the wheel A, a raised rim, s, is cast on the wheel A, which acts as a stop to prevent the forward sliding of these pawls.

I do not wish to claim, broadly, the construction of a brake having a wheel with ratchets on its sides to be operated by two pawls, a cross-head, and a lever, for that construction is shown and described in Letters Patent No. 88,438, granted to Albert A. Bliven, on the 30th of March, 1869; but What I do claim as new, and desire to secure by Letters Patent, is—

1. In a car-brake, the combination of the following elements: a journaled wheel with ratchets on each side of the same, a groove in the periphery of said wheel, and a rope or chain fixed to said periphery, two pawls to engage with the ratchets on the journaled wheel and pivoted to a pivoted cross-head, and an operating-lever, as and for the purpose described.

2. In combination, a car-brake, a pivoted cross-head provided with a rubber cushion, L, and nut n, pawls G and H, link-bars K, and an operating-lever, M, as and for the purpose described.

3. In combination, a car-brake with a pivoted cross-head, F, pawls G and H, a link-bar, K, eyebolts k, and rubber washers l, as and for the purpose described.

4. In combination, a car-brake with a pivoted cross-head, F, a curved projection, n, fixed to its rear face, and a metal bearing-plate, o, fixed to the platform of the car or its framework, as and for the purpose described.

5. In combination, a car-brake, a journaled wheel with ratchets on its two sides, a groove in its periphery, and a device fixed on its periphery to which is secured one end of a brake chain or rope, as and for the purpose described.

J. R. BAKER.

In presence of—
JAMES ALLEN,
D. A. CARPENTER.